July 17, 1934. V. R. DESPARD 1,966,542
ELECTRIC WIRING APPARATUS
Filed June 6, 1932
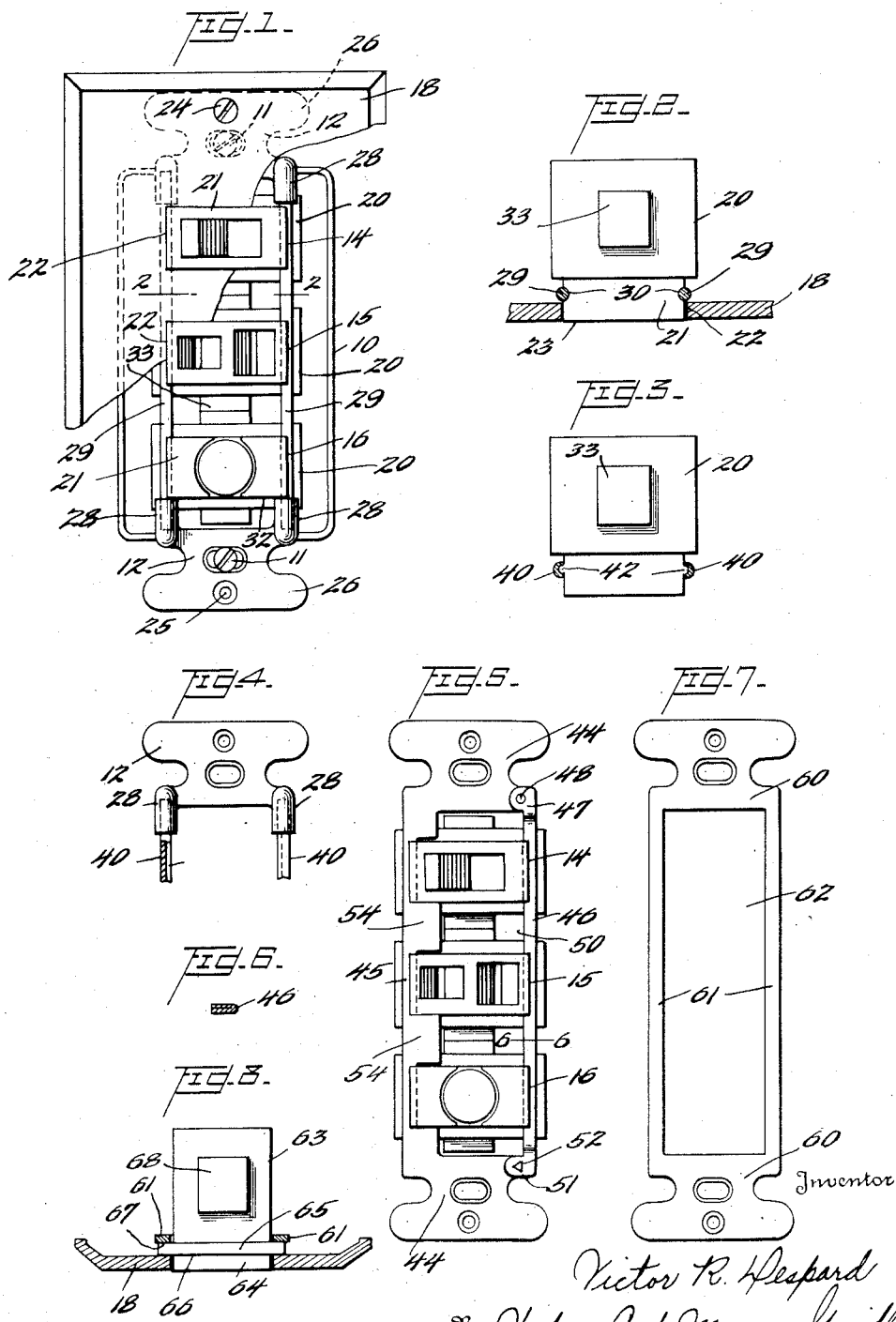

Patented July 17, 1934

1,966,542

UNITED STATES PATENT OFFICE 1,966,542

ELECTRIC WIRING APPARATUS

Victor R. Despard, Syracuse, N. Y., assignor to Pass & Seymour, Inc., Syracuse, N. Y., a corporation of New York Application June 6, 1932, Serial No. 615,717

11 Claims. (Cl. 247—20)

This invention relates to electric wiring apparatus, and particularly to terminal, indicating and switching apparatus as used in the walls, base boards and the like of dwellings, offices and similar buildings wherein the apparatus is mounted in outlet boxes the outer faces of which are covered by wall plates.

It is a general object of the present invention to provide novel and improved apparatus of the type set forth.

More particularly it is an object of the invention to provide electric wiring apparatus wherein a plurality of individual wiring devices may be arranged in the space heretofore allotted to a single device and in which interchangeability of the devices provides for the arrangement of any desired combination of devices in a single outlet box.

One of the important features of the invention resides in the provision of electric wiring devices of various functions, each of which is less than single gang size and which can be mounted in any desired combination alone or in multiple behind wall plates in which they are interchangeable.

Another feature of the invention resides in the provision of supporting means, whereby a plurality of wiring devices may be mounted behind a single gange plate and accurately positioned and spaced in respect to the uniform openings therein.

Still another important feature of the invention resides in the provision of various forms of mounting bridges which are adapted to extend longitudinally of a single gang outlet box and are arranged to carry one or more wiring devices directly spaced behind a wall plate having uniform openings therein and in which the bridges are provided with means to cooperate with portions of the wiring devices to hold them in position in the bridge.

A further important feature of the invention resides in the provision of a wiring device supporting bridge having therein a single large opening which is adapted to receive and hold as many as three individual wiring devices and wherein there is provided a single means to engage each of the devices to hold them in position in the bridge.

Other objects and features of the invention, such as the construction, assembly and arrangement of the bridges and the means thereon for engaging the wiring devices as well as other details of construction and mounting of the parts, will be clearly set forth hereinafter and will be evident to those skilled in the wiring art from a consideration of the accompanying drawing and following specification wherein are disclosed several exemplary embodiments of the invention with the understanding, however, that these various embodiments or parts thereof may be assembled or re-arranged to form new combinations such as fall within the scope of the appended claims without departing from the spirit of the invention.

In said drawing,

Figure 1 is a face view of wiring apparatus constructed in accordance with the present invention and mounted in an outlet box, showing the wall plate partially broken away to disclose the interior mechanism;

Figure 2 is a transverse section on line 2—2 of Fig. 1, showing the manner of securing the individual wiring devices in the bridge and behind the wall plate;

Figure 3 is a view similar to Fig. 2, showing a modification in which the bridge rods are of different configuration;

Figure 4 is a fragmentary view of the bridge for cooperation with the wiring device of Fig. 3;

Figure 5 is a plan view of a further form of bridge;

Figure 6 is a fragmentary section on line 6—6 of Fig. 5, showing the construction of the closing member;

Figure 7 is a plan view of a still further bridge embodiment; and

Figure 8 is a section through a wall plate wiring device and bridge of the type shown in Fig. 7.

When placing wiring devices for walls, base boards and the like in homes, offices and other buildings it has heretofore been the custom to mount each device such, for instance, as a switch, convenience outlet, pilot light etc., in a single outlet box or at least in the space of a single outlet box, or where several devices were to be mounted in a group a larger size box was used to receive these devices. The outlet box adapted to receive a single such device has by usage come to be known as a "single gang" box and likewise those for two devices "two gang boxes" etc., so that the expression "one gang", "two gang", "three gang" etc. designates clearly to those skilled in the art the size of the box and the cooperating parts as, for instance, the wall plates.

There have been some attempts to combine several units in the space of a single gang box but in every case these assemblies were all formed integrally and in preconceived combinations for which a special wall plate was required. In order to make up a desired and special combination it has been necessary to resort to the expedient of using the space of a single gang box for each element of the combination, and where a number of elements were desired, the apparatus became exceedingly cumbersome and certainly did not add to the ornamentation of the room owing to the large size of the wall plate.

In accordance with the present invention, there are provided various types of bridges for mounting a plurality of wiring devices in a single gang box and behind a single gang plate, which plate may be provided with three or less uniform openings. The wiring devices are provided with uniform parts to cooperate with the openings in the plate and are arranged with mounting means so that they can be interchangeably secured in the bridges behind the openings in the plate.

With this arrangement the stock required to be carried by a jobber or contractor is reduced to about one-sixth of the amount heretofore required to be carried, while permitting a greater flexibility of combinations. In fact several hundred combinations are possible with but less than twenty items for their accomplishment. The economy in manufacturing so few items is apparent. The consumer benefits in his wiring costs and in the appearance of the visible outlets. In most cases, with these interchangeable devices, the installation of a single gang box is all that is necessary whereas now two or more gangs have to be installed to provide similar combinations, requiring more wall space, more expensive multiple gang plates and boxes, and more labor.

The present invention is feasible largely by virtue of the unique construction of the individual units whereby they are sufficiently small so that three can be assembled in a single gang box and by virtue of the novel means for supporting and mounting these units in proper position and spacing for association with the openings in the wall plate.

Wherever in the specification and claims the expression "one gang" or a similar expression is used, it is intended to refer to what is commonly known by that designation. The expression "wiring device" refers to any unit intended for mounting in an outlet box behind and/or through a wall plate and includes blanks for closing unused openings in the plate.

This invention is a continuation in part of my copending application Serial Number 554,323, filed July 31, 1931, now Patent No. 1,875,224, for Electric wiring apparatus, and it relates particularly to various modifications of the bridge member and of those portions of the wiring devices which cooperate therewith.

Referring now to the drawing, there is shown at 10 in Fig. 1 a conventional outlet box of the single gang size to which is attached a bridge by screws 11 passing through the ears 12 thereof. The screws are received in struck out ears, not shown, on the box as is conventional. The bridge supports, in the form shown, three wiring devices 14, 15 and 16 behind the wall plate 18 having three uniformly sized openings for access to the wiring devices.

The various types of wiring devices and their construction is more clearly set forth in the above mentioned application, and here it is only necessary to state that these devices are for various purposes and may include switches of several types, convenience outlets for power, radio, telephone and the like, pilot lights, push buttons etc. Each of these devices includes a block 20 of insulating material, as shown in Fig. 2, which holds the various electrical contacts and parts and which is preferably provided with the neck 21 at its front face which is of such size as to have its edges fit snugly against the walls of the opening 22 in the wall plate, which receives it, and preferably with its front face 23 substantially flush with the front face of the plate 18. This is not essential, however, and the wiring devices may each merely have a face which fits against the rear face of the plate surrounding the opening therein.

In order to permit the assembly of any desired combination of devices in a box, they are provided to be interchangeable so that any one will fit behind any opening in the wall plate. In accordance with the present embodiment of the invention, the devices are first mounted in a supporting bridge which holds them in the box in proper spaced relation to receive the wall plate which is itself attached to the bridge by means of screws 24 passing therethrough and received into threaded openings 25 in the plaster ears 26 on the ends of the bridge. By this arrangement the parts are all held in proper relationship and a rigid assembly is provided.

In Fig. 1 the bridge is shown as comprising two end members 12 each including an intermediate portion having an opening to receive one of the screws 11, a plaster ear 26 which rests on the plaster in the conventional manner to locate the bridge in respect to the wall surface, and the pair of spaced sockets 28 which are longitudinally drilled, each to receive one end of one of the rods 29 which extend between the two sets of sockets. These rods may conveniently be secured permanently in one set of sockets and removably in the other, so that one end member can be removed to permit the insertion of wiring devices and can then be replaced to hold them in position.

As shown in Fig. 2, the end walls of the necks are grooved as at 30 for cooperation with the rods 29. The ends of the sockets 28 are so positioned that when they are assembled on the outlet box, they abut the sides 32 of the necks to position the end wiring devices in respect to the box walls. It may be desirable to provide positive means for positioning the central wiring device in order that the plate can readily be set over them and the necks cooperate with the openings therein, but this is not necessary, since the friction of the rods on the sides of the necks will be sufficient and the central member can be spaced carefully before placing the plate in position. However, if it is desired to have this spacing means, lugs such as at 33 may be formed integrally with the insulation blocks 20 to cooperate with each other and space the devices properly in the bridge.

Figs. 1 and 2 show the bridge rods of circular cross section, whereas Figs. 3 and 4 show these rods to be of channel form or U-shaped in cross section, as seen best at 40 in Figs. 3 and 4. These rods may be received in circular bores in the sockets in the end members if desired, or these socket bores can be of the same cross sectional configuration as the rods. To provide for engagement of the rods with the necks of the wiring devices 20, the necks are formed with integral ribs 42 on their end walls which are received in the channels of the rods 40.

In Fig. 5 is shown a further embodiment of bridge construction wherein the bridge is formed from a punching of sheet metal having the ends 44 and the integral side rail 45. The other side is open and is arranged to be closed by a separate movable side rail 46 which may be formed of a folded strap, a cross section of which is shown in Fig. 6. One end is spread and widened to fit over one end member of the bridge, as shown at 47, and the rivet 48 secures it in position and forms a pivot about which it can be swung to open up the single large aperture 50 of the bridge. The opposite end of the rail is provided with spaced clips 51 which take over the other end of the bridge and may be provided with depressions 52 to be received in a hole in the bridge end to latch the two together.

This type of bridge may cooperate with wiring devices having necks which are grooved to receive the side rails or with wiring devices of the type disclosed in Fig. 8, which will be later described. In either event it may be desirable to space the devices in the bridge positively, which can be done by spacing lugs 54 formed integrally with and projecting laterally from the integral side rail 45. They can be short, as shown, or may extend clear across the width of the opening 50.

In Fig. 7 is shown a one-piece bridge of stamped metal having the ends 60 as described in connection with prior forms and the two integral side rails 61 forming the single central opening 62 to receive the wiring devices. This type of bridge cooperates with wiring devices 63, as shown in Fig. 8, each of which has not only a neck 64 to be received in an aperture in the wall plate 18, but has a flange 65 which forms a forward shoulder 66 to engage with the rear wall of the plate, and a rearward shoulder 67 against which the side rails 61 of the bridge bear to clamp the flange 65 between the plate and bridge and hold the wiring device rigidly in position. With this construction spacers, such as shown at 68, may be provided on the wiring device blocks or spacers, as at 54 in Fig. 5, may be arranged on the bridge.

It will be seen that the essential generic feature of all of the bridges of this application is that they have a single central aperture which receives all of the wiring devices and that engages these wiring devices closely behind the wall plate. Bridges of the type described are suitable for use with one, two or three wiring devices in a single gang box and require no variations to permit changing the spacing between the devices such as will occur when two devices instead of three, for instance, are used in a single gang plate. It will be appreciated that where a two gang box is provided, two bridges will be used, one for each gang, and so on for larger boxes.

Having thus described the invention, what is claimed as new and desired to be secured by Letters Patent is:

1. In combination with an outlet box and a wall plate having a plurality of uniform openings therein, of an individual wiring device in back of said plate for each opening, a neck on each device to engage the walls of its opening, and a bridge adapted to be secured to said box and to support said wall plate, each neck having a groove in one side thereof and common means on said bridge to engage all of said necks to cause cooperation of the groove walls and bridge to hold the devices fixed in the bridge independent of the wall plate.

2. In combination with an outlet box and a wall plate having a plurality of uniform openings therein, of an individual wiring device in back of said plate for each opening, a neck on each device to pass through and engage the walls of its opening, a bridge adapted to be secured to said box and to support said wall plate, and common means independent of the wall plate associated with said bridge to engage the necks of each of said devices to hold them in the bridge against movement normal to the plane of the bridge.

3. In combination with an outlet box and a wall plate having a plurality of uniform openings therein, of an individual wiring device in back of said plate for each opening, a neck on each device to pass through and engage the walls of its opening, a bridge adapted to be secured to said box and to support said wall plate and having openings for said necks, said devices each having a shoulder to abut the rear of said wall plate, and single means independent of the wall plate bearing on said bridge to engage each of said devices near said shoulder to hold the same fixed in the bridge and to hold said shoulder against the plate.

4. Wiring apparatus of the type described including, in combination with a single gang outlet box, a wall plate therefor having a plurality of uniform openings therethrough, a wiring device for each opening, each having a different function and interchangeable at said openings, each device including an insulation block, a neck thereon to cooperate with the walls of any one of said openings, a bridge having an opening to receive each neck and single means independent of the wall plate cooperating with the bridge to hold the devices fixed therein and in position in respect to said openings, and means to support the bridge from the box.

5. Wiring apparatus of the type described including, in combination with a single gang outlet box, a wall plate therefor having a plurality of uniform openings therethrough, an individual wiring device for each opening and interchangeable thereat, each device including an insulation block having a surface adapted to engage the rear face of said plate, a bridge adapted to be supported from said outlet box and having a single opening to receive a part of each insulation block, means on the bridge to space said blocks in said opening in conformity with the plate openings and means on the bridge independent of the wall plate to lock the blocks therein against movement in any direction relative thereto.

6. Wiring apparatus of the type described including, in combination with a single gang outlet box, a wall plate therefor having a plurality of uniform openings therethrough, an individual wiring device for each opening and interchangeable thereat, each device including an insulation block, and a bridge adapted to be supported from said outlet box and having a single opening to receive a part of each insulation block, said bridge comprising end members each having two sockets, and a pair of rods extending between said members and engaged in said sockets.

7. Wiring apparatus of the type described including, in combination with a single gang outlet box, a wall plate therefor having a plurality of uniform openings therethrough, an individual wiring device for each opening and interchangeable thereat, each device including an insulation block, and a bridge adapted to be supported from said outlet box and having a single opening to receive a part of each insulation block, said bridge comprising end members each having two sockets, and a pair of rods extending between said members and engaged in said sockets, each block being formed to cooperate with said rods for support thereby.

8. Wiring apparatus of the type described including, in combination with a single gang outlet box, a wall plate therefor having a plurality of uniform openings therethrough, an individual wiring device for each opening and interchangeable thereat, each device including an insulation block, and a bridge adapted to be supported from said outlet box and having a single opening to receive a part of each insulation block, said bridge comprising end members each having two sockets, and a pair of rods extending between said members and engaged in said sockets, each block being formed to cooperate with said rods for support thereby, and means on said blocks to space them longitudinally of said rods for cooperation with said openings.

9. Wiring apparatus of the type described including, in combination with a single gang outlet box, a wall plate therefor having a plurality of uniform openings therethrough, an individual wiring device for each opening and interchangeable thereat, each device including an insulation block, and a bridge adapted to be supported from said outlet box and having a single opening to receive a part of each insulation block, one side member forming said opening being hinged to the bridge proper whereby the block can be inserted in the opening and secured therein by said side.

10. Wiring apparatus of the type described including, in combination with a single gang outlet box, a wall plate therefor having a plurality of uniform openings therethrough, an individual wiring device for each opening and interchangeable thereat, each device including an insulation block, and a bridge adapted to be supported from said outlet box and having a single opening to receive a part of each insulation block, one side member forming said opening being hinged to the bridge proper whereby the block can be inserted in the opening and secured therein by said side, and means on one side of the opening to space the blocks longitudinally thereof.

11. In combination with an outlet box and a wall plate having a plurality of uniform openings therethrough, of an individual wiring device in back of said plate for each opening, a neck on each device to pass through and engage the walls of its plate opening, a bridge adapted to be secured across the face of the outlet box and to support the wall plate and the wiring devices, said necks passing through said bridge and a single means independent of the wall plate associated with and movable in respect to said bridge to engage each of the devices to fix them in the bridge against movement away from the wall plate.

VICTOR R. DESPARD.